UNITED STATES PATENT OFFICE.

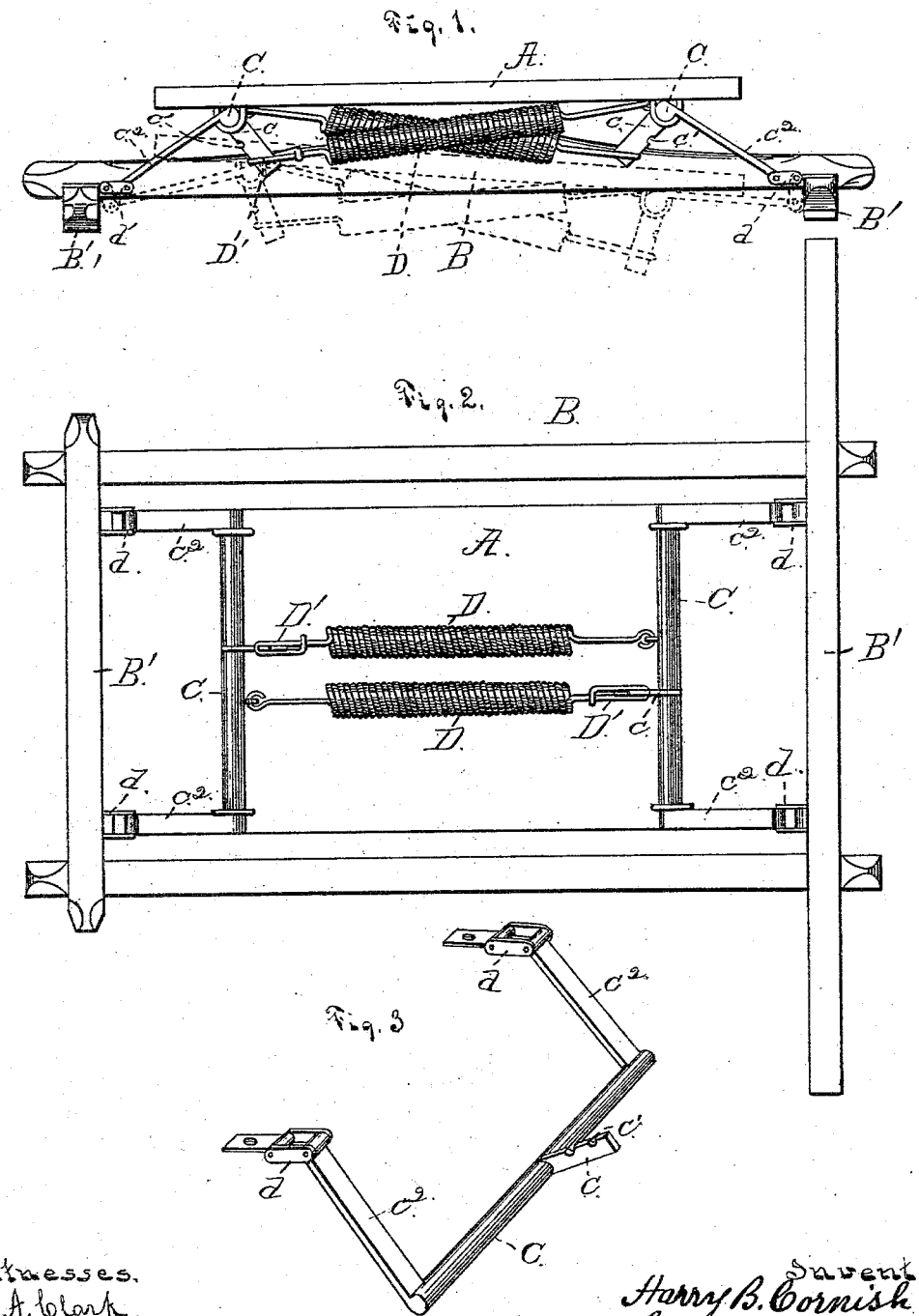

HARRY B. CORNISH AND SAMUEL E. HALL, OF HAMPTON, IOWA.

VEHICLE-SPRING.

SPECIFICATION forming part of Letters Patent No. 288,312, dated November 13, 1883.

Application filed July 3, 1883. (No model.)

*To all whom it may concern:*

Be it known that we, HARRY B. CORNISH and SAMUEL E. HALL, citizens of the United States, residing at Hampton, in the county of Franklin and State of Iowa, have invented certain new and useful Improvements in Vehicle-Springs; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention has relation to improvements in vehicle-springs.

It consists in the peculiar construction, combination, and arrangement of the several parts, as will be hereinafter fully described and claimed.

In the drawings, Figure 1 is a side elevation, and Fig. 2 is an under plan view, of a portion of a vehicle containing our improvement; and Fig. 3 shows, in perspective, one of the shafts with its bars, &c., as will be described.

A represents the vehicle-bed, and B the running-gear frame. The frame B may be of any desired shape or construction, so that suitable bars, B' B', are provided, for the purposes hereinafter described.

The shafts C C are journaled on the under side of the bed A at a point, preferably, about one-quarter the length of the said bed from the opposite ends thereof. These shafts are each provided with a bar, $c$, extended radially and inclined inward toward the middle of the vehicle, and are provided on their outer edges with a series of notches, $c'$. Bars $c^2$ are extended radially from the ends of the shafts C outward at approximately right angles to the bar $c$ of their common shafts, and are connected at their outer ends to the bars B' of the framing by means of the links $d$. These links $d$ are pivoted at their upper or outer ends to the bars B', and at their inner ends to the ends of bars $c^2$, as shown. These links, as will be seen in dotted lines, Fig. 1, turn down against the inner edge of the bars B when the bed is depressed in the operation of the devices.

Extensible springs D are made fast at one end to the wagon-bed, and their opposite ends are provided with suitable eyes, D', which catch in the notches $c'$, and may be set to or away from the shafts, in order to vary the degrees of stiffness of the spring.

The motion of the several parts, when the vehicle-bed is depressed, is clearly illustrated in dotted lines, Fig. 1.

We only employ one of the bars, $c$, on each of the shafts C; but it will be understood that two or more could be employed, where so desired, and several springs be therefore connected with each shaft.

Where so desired, only one of the bars, $c^2$, need be used; but this would necessitate the providing of other means for preventing lateral movement of the vehicle-bed and irregular depression of the sides thereof. We prefer, however, the construction as shown and hereinbefore described, as one spring to each shaft is usually sufficient, and it gives a better and firmer connection to employ two of the connection-bars $c^2$.

Where the load is heavier at one end than the other, the springs may be moved in the notches $c'$, so as to be stronger at the point of greatest weight, in order that the bed A may be depressed equally over its entire surface.

Having thus described our invention, what we claim, and desire to secure by Letters Patent, is—

The combination, with the framing B and vehicle-bed, of the shafts C, journaled on the under side of the said bed, bars $c^2$, extended outward from said shaft and connected with the framing B, bars $c$, extended inward from said shafts and having a series of notches, $c'$, formed on their outer edges, and the springs having one end made fast to the vehicle-bed and their outer ends provided with a loop slipped over the bars $c$ and engaging the notches $c'$, whereby the said springs are capable of adjustment to support the bed A in a level position with the load unequally disposed thereon, substantially as and for the purposes set forth.

In testimony whereof we affix our signatures in presence of two witnesses.

HARRY BUTTON CORNISH.
SAMUEL ELLIS HALL.

Witnesses:
W. A. HAMMOND,
D. W. DOW.